United States Patent [19]
Rumbaugh

[11] Patent Number: 5,311,840
[45] Date of Patent: May 17, 1994

[54] HAY SAVING ROUND BALE FEEDING APPARATUS AND METHOD

[76] Inventor: Earnest F. Rumbaugh, R.R. 1, Box 155, Morrill, Kans. 66515

[21] Appl. No.: 2,340

[22] Filed: Jan. 8, 1993

[51] Int. Cl.⁵ ............................................. A01K 1/10
[52] U.S. Cl. .................................................... 119/60
[58] Field of Search ............................. 119/58, 59, 60

[56] References Cited

U.S. PATENT DOCUMENTS

| | | | |
|---|---|---|---|
| 42,927 | 5/1864 | Close | 119/58 |
| 59,236 | 10/1866 | Ladd | 119/58 |
| 3,906,903 | 9/1975 | Vandewater | 119/60 |
| 4,020,794 | 5/1977 | Nethery | 119/58 |
| 4,128,278 | 4/1979 | Anderson | 119/60 |
| 4,258,663 | 3/1981 | Schoessow | 119/58 |
| 4,285,300 | 8/1981 | Spane | 119/58 |
| 4,706,609 | 11/1987 | Delichte | 119/60 |
| 5,067,442 | 11/1991 | Schilling | 119/60 |
| 5,148,040 | 10/1992 | Martin | 119/58 |
| 5,178,096 | 1/1993 | Lock | 119/60 X |

FOREIGN PATENT DOCUMENTS

| | | | |
|---|---|---|---|
| 9014001 | 11/1990 | PCT Int'l Appl. | 119/60 |
| 2154418 | 9/1985 | United Kingdom | 119/60 |

OTHER PUBLICATIONS

"The Big Bale Diner" Sales Brochure from Koso Feeder Sales of Rulo, Nebr.

*Primary Examiner*—Robert P. Swiatek
*Attorney, Agent, or Firm*—Litman, McMahon & Brown

[57] ABSTRACT

A hay saving round bale feeder includes a rectangular framework constructed around a central round bale cradle. The framework comprises a pair of side frames, an end frame, and a cradle access gate, each of which accommodates a number of livestock feeding stations. Each feeding station is defined by a pair of parallel side bars which are spaced to allow a feeding animal to insert its head and neck but not its shoulders. The feeding stations are spaced from the bale cradle to provide an interim hay saving space into which dropped hay will fall. A hay deflector, with a cross section shaped as an inverted V, is positioned beneath the bottom center of the bale cradle to deflect any dropped hay to within easy reach of the feeding livestock.

15 Claims, 2 Drawing Sheets

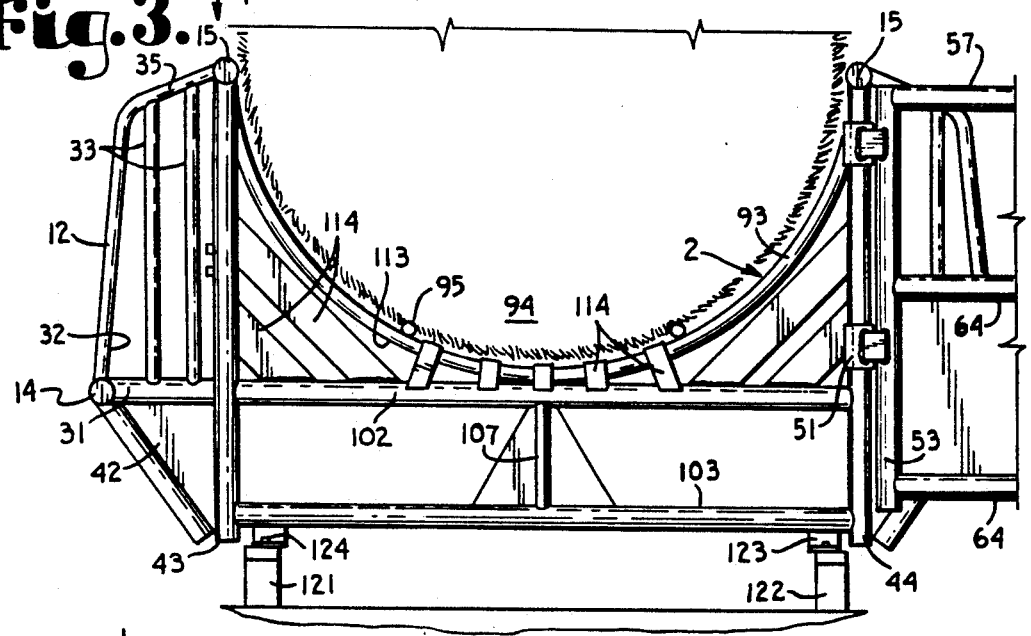
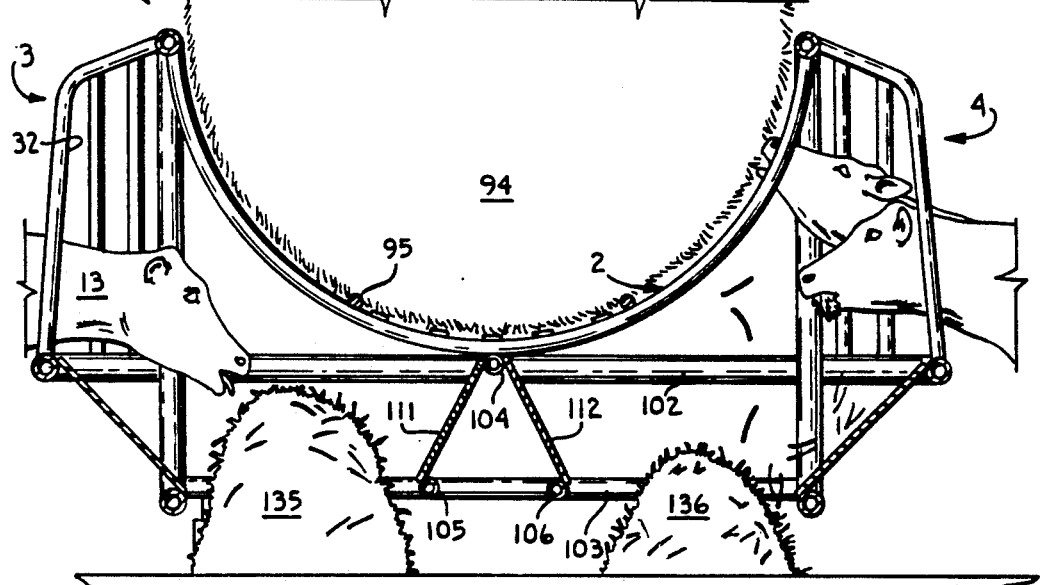
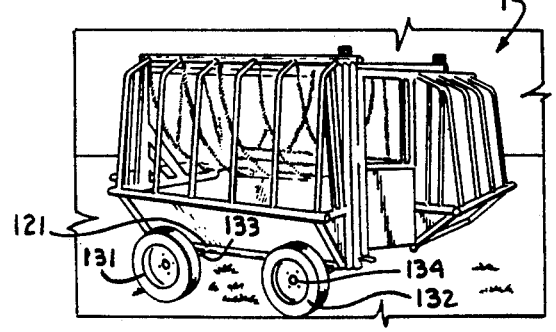

HAY SAVING ROUND BALE FEEDING APPARATUS AND METHOD

BACKGROUND OF THE INVENTION

I. Field of the Invention

The present invention relates to an apparatus and method for feeding livestock and, in particular, to an apparatus and method for holding a round hay bale while allowing livestock access to the bale for feeding. The apparatus has a "hay saving" feature which spaces the feeding livestock from the hay bale and retains dropped hay within the space.

II. Description of the Related Art

Prior art round bale feeders have generally included some type of bale holding cradle which is accessible by livestock from one or more sides of the feeder. In most such feeders, the livestock are not spaced from the cradle and thus can feed directly from the hay bale. In so feeding, livestock create a considerable amount of waste. Hay is pulled from the hay bale and dropped at the feet of the livestock, then trampled and soiled to a condition in which it is no longer usable as feed. Estimates for the amount of hay wasted from such feeders range up to 50 per cent.

Examples of such prior art feeders include U.S. Pat. No. 3,906,901 to Richard D. Cox, which teaches a rectangular shaped round bale feeder with a plurality of spaced parallel bars defining livestock feeding stations. U.S. Pat. No. 4,148,278 to Joseph A. Anderson teaches a portable feeding device which includes a barrier which can be positioned to surround a haystack. The barrier prevents cattle from trampling the hay within the stack and includes a deck which prevents them from extending their heads substantially beyond the barrier.

Numerous attempts have been made to address the problem of wasted hay in such feeders. Examples include U.S. Pat. No. 4,258,663 to John Schoessow teaches a mobile livestock feeder with a pair of feeding troughs with an inner and an outer framework arranged to prevent livestock from dragging substantial amounts of feed from the troughs. U.S. Pat. No. 4,706,609 to Lawrence Delichte teaches a cylindrically shaped round bale feeder in which the bale is stood on one end in a central cylinder and the livestock feed from a spaced outer cylinder. U.S. Pat. No. 5,158,040 to Martin teaches a rectangular shaped round bale feeder in which a central bale holding cradle is positioned well above a floor. Hay falling from the bale lands on the floor where livestock extending their heads through a surrounding framework can feed on the bale or the hay dropped on the floor.

While these feeders have been somewhat successful in remedying the problem of wasted hay, they have often made it difficult for the feeding livestock to reach the spaced bale, and/or have caused hay dropped by the livestock to be difficult to reach. Loading and removal of the large round bales from such feeders has been a problem as well.

It is clear then, that a need still exists for a round hay bale livestock feeder which includes a hay saving space between the feeding livestock and the round bale. Such a feeder should make the round bale itself readily accessible, but must also make any hay dropped by the feeding livestock easily accessible as well. In addition, it should be relatively easy to load and remove round bales from the feeder.

SUMMARY OF THE INVENTION

An improved hay saving round bale livestock feeding apparatus and method are provided for holding and feeding large round hay bales to a plurality of farm animals or livestock, particularly cattle. The apparatus includes a frame, which is rectangularly shaped, having four sides including a front end, a rear end, and a pair of opposing sides. At one end, a selectively openable gate portion is provided, which provides interior access to the apparatus for loading hay bales.

The apparatus can be mounted on wheels consisting of a transverse axle having a pair of side wheels mounted thereon and a dolly-type front wheel arrangement which, in conjunction with the side wheels, provides stand-alone support for the apparatus. A tongue with a hitch can be connected to the front wheel arrangement such that the apparatus can be towed.

A plurality of feeding stations are arranged in generally side-by-side relationship along each Of the four sides of the apparatus. Each of the stations includes a pair of side bars which are fixedly connected to the frame such that they are generally vertically oriented. A centrally located cradle is adapted to support one or more round hay bales. A hay saving space is provided between the cradle and the feeding station side bars such that livestock which reach their necks through the side bars can reach the hay bale for feeding. However, any hay which is dropped by the feeding livestock falls drops to the ground within the hay saving space. The feeding livestock can then reach down to feed on the saved hay.

The method includes the steps of placing a round bale in a cradle spaced from one or more feeding livestock by a hay saving area, and deflecting hay dropped by such feeding livestock into a portion of the hay saving area where the livestock can easily reach the dropped hay. It further includes the step or providing easily accessibility to the cradle for loading and removal of the round bales.

PRINCIPAL OBJECTS AND ADVANTAGES OF THE INVENTION

Therefore, the principal objects and advantages of the present invention include: providing an improved apparatus and method for feeding livestock; providing such an apparatus and method in which a round bale is positioned in a central cradle; to provide such an apparatus in which a number of livestock feeding stations are positioned around the central cradle; to provide such an apparatus in which the feeding stations are separated from the cradle by a hay saving space; to provide such an apparatus in which hay dropped by livestock feeding from the round bale will drop into the hay saving space; to provide such an apparatus in which a hay deflector is positioned below the cradle to deflect dropped hay to one side of the cradle to make it easily accessible to livestock on that side; to provide such an apparatus in which a gate is positioned at one end to provide access to the cradle for loading or unloading hay bales; to provide such a method in which hay dropped from a centrally located bale cradle is deflected to a hay saving space where it is easily accessible by feeding livestock and generally providing such an apparatus which is efficient and reliable, economical to manufacture, simple to maintain, and which generally performs the requirements of its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary, end elevational view of the round bale feeder, with the cradle access gate swung open.

FIG. 4 is an enlarged, cross-sectional view of the round bale feeder, taken along line 4—4 of FIG. 2.

FIG. 5 is a reduced, perspective view of a round bale feeder, with wheels provided for added mobility.

DETAILED DESCRIPTION OF THE INVENTION

I. Introduction and Environment

Figure 1:
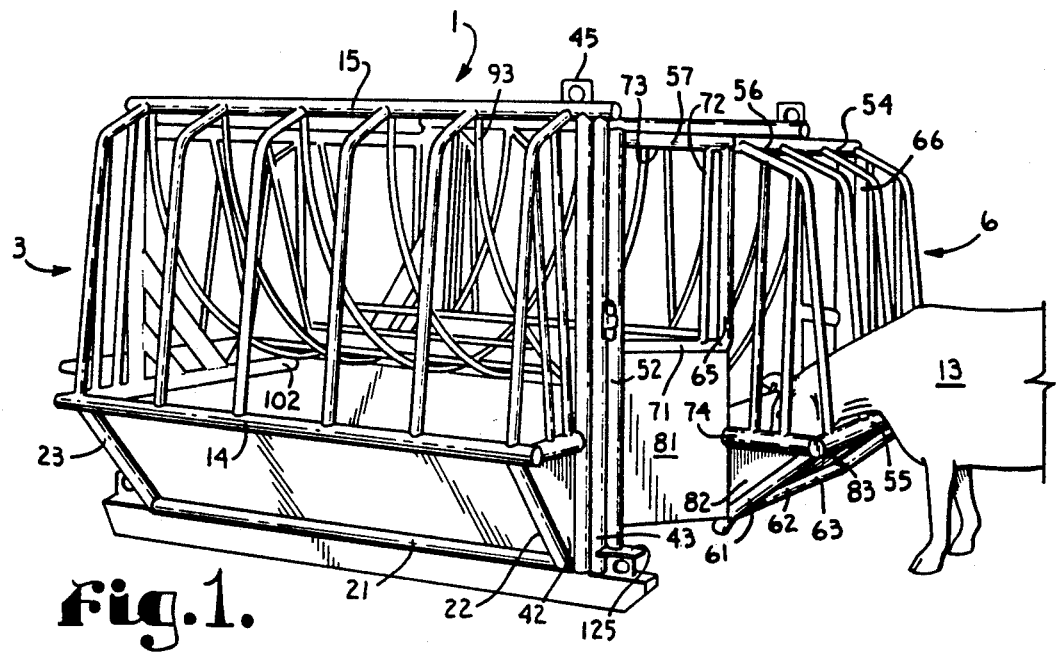
FIG. 1 is a perspective and fragmentary view of a hay saving round bale livestock feeding apparatus, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 1 in FIGS. 1-5 generally refers to a hay saving round bale livestock feeder in accordance with the present invention. The feeder 1 comprises a centrally located bale cradle 2 in a rectangular framework which includes left and right side frames 3 and 4, and end frame 5, and a cradle access gate 6.

II. Feeder Construction

Each of the side frames 3 and 4, the end frame 5, and the gate 6 comprises a plurality of livestock feeding stations 11. Each feeding station 11 is spaced between two parallel side bars 12. The side bars 12 are spaced apart sufficiently to allow a feeding animal 13 to insert its head and neck through each of the stations 11, but not its shoulders.

The side frames 3 and 4 are essentially mirror images of each other, and only the side frame 3 will be described in detail. Referring to FIG. 1, in the side frame 3, the side bars 12 extend between a horizontal station support 14 and an upper horizontal frame support 15. The station support 14 is connected to a bottom horizontal frame support 21 via a pair of angled supports 22 and 23. A pair of vertical frame members 24 and 25 extends between the bottom frame member 21 and the top member 15, and a pair of short horizontal station supports 31 extends between the vertical members 24 and 25 and the station horizontal support 14. The horizontal supports 31 and the angled supports 22 and 23 define a hay saving space 32 between the station support 14 and the vertical frame members 24 and 25. A pair of guard bars 33 extends between the short supports 31 and a top angled portion 35 of the end side bars 12 to block off the ends of the hay saving space 32 to prevent an animal 13 from getting caught therein. A rectangular metal panel 41 and a pair of triangular metal panels 42 block the lower portions of the space 32. An additional vertical frame member 43 is provided at the gate end of the side frame 3 and a vertical frame member 44 is provided at the gate end of the side frame 4. The additional vertical frame members 43 and 44 provide spacing for the gate 6 so that it can freely swing open. A number of lifting eyelets 45 are attached to the top of the frame members 15.

The end frame 5 and the gate 6 are also essentially mirror images of each other, except that the gate 6 is slightly smaller to compensate for the additional vertical frame members 43 and 44, and the gate 6 is pivotally attached by hinges 51 to the frame member 44. Accordingly, only the gate 6 will be described in detail herein.

Figure 2:
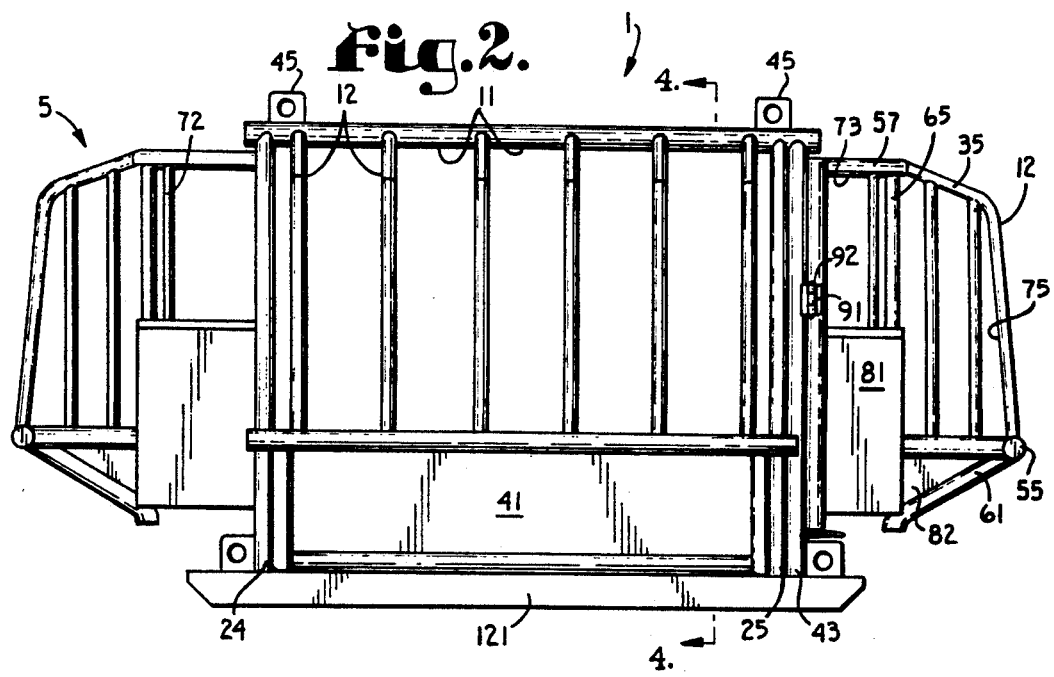
FIG. 2 is a side elevational view of the hay saving round bale livestock feeder.

Referring to FIGS. 1-3, the gate 6 comprises a pair of vertical frame members 52 and 53, which are each connected to respective ends of a top horizontal frame member 54. A plurality of side bars 12, with angled top portions 35, are attached to the frame member 54, and extend therefrom to a horizontal station support 55. Note that the frame member 54 includes a central portion 56 and a pair of angled side portions 57. A pair of angled supports 61 extend between the station support 55 and a bottom frame member 62. The bottom frame member 62 is shaped with a straight portion 63 and a pair of angled portions 64, just as is the top member 54. A pair of vertical frame members 65 and 66 extend between the top and bottom frame members 54 and 62. A pair of angled horizontal supports 71 extend between the vertical frame members 65 and 66 and the vertical frame members 52 and 53, respectively. One or more space defining bars 72 extend between the top frame member 54 and the angled supports 71 to define additional feeding windows 73. A pair of horizontal supports 74 extend between the station support 55 and the vertical frame members 65 and 66 to define a hay saving space 75. Metal panels 81, 82, and 83 are positioned to close corresponding spaces in the lower portion of the gate 6. A latch 91 is attached to the vertical frame members 52 on the gate 6 and the vertical frame member 43 on the side frame 3. A latch pin 92 can be inserted in the latch 91 to keep the gate 6 in a closed position.

The bale cradle 2 comprises a plurality of semicircular bale support ribs 93, which extend between the top horizontal frame members 15 of the side frames 3 and 4. A shown in FIGS. 3 and 4, the support ribs 93 are sized to accommodate a round bale 94 and position it within feeding reach of livestock standing at the stations 11. A pair of longitudinally extending braces 95 interconnects the ribs 93 to add rigidity to the cradle 2.

Referring to FIG. 3, a pair of horizontal frame members 102 and 103 is provided at either end of the feeder 1 to connect the side frames 3 and 4. A longitudinally extending bracing bar 104 extends between the frame members 10 while a pair of longitudinally extending bracing bars 105 and 106 extends between the frame members 103. The bar 104 provides a center support for the ribs 93. A vertical bracing bar 107 extends between the frame members 102 and 103 on either end. A pair of rectangular metal panels 111 and 112 extends between the bar 104 and the bars 105 and 106, respectively to form an inverted V. When the gate 6 is swung open, a gap 113 exists between the outermost rib 93 and the frame members 102, 43 and 44. A number metal straps 114 of various sizes are welded to partially close the gap 113 to prevent an animal from getting caught therein.

The feeder i is bolted to a pair of skids 121 and 122 via a number of angle supports 123 and bolts 124. The skids 121 and 122 are preferably made of pressure treated wood. A spring loaded plate 125 is attached to the side frame 3 just above and outboard of the skid 121 to engage a base portion of the vertical frame member 52 when the gate 6 is closed to prevent the gate 6 from inadvertently opening.

In FIG. 5, for increased mobility of the feeder 1, two pairs of wheels 131 and 132 are shown attached to the skids 121 and 122, via a corresponding pair of axles 133 and 134. The wheels 131 and 132 can be permanent or they can be made removable once the feeder 1 is placed in a desired location.

III. Operation

The feeder 1 is first positioned at a desired feeding location by lifting it by a chain attached to the lifting eyelets 45 or rolling it via the wheels 131 and 132. Next the gate 6 is swung open, a round hay bale 94 is placed in the cradle 2 and the gate 6 is swung closed and latched via latch 81 and spring plate 125. With the bale 94 placed in the cradle 2, it is just within feeding reach of livestock positioned at the feeding stations 11 around the feeder 1. The hay saving spaces 32 and 75, however, insure that the feeding animals 13 will not drag hay out of the feeder 1 where it can be trampled, soiled and ruined. Instead, any dropped hay will fall within the hay saving spaces 32 and 75, where the dropped hay can be reached by the feeding animals 13. Furthermore, hay dropping from the bale 94, or being dropped by feeding animals 13 will strike the sides of the inverted V formed by the plates 111 and 112 and be directed into feeding piles, such as the piles 135 and 136 in FIG. 4, within easy reach of the feeding animals 13.

In a preferred embodiment of the feeder 1, the structural frame members, such as the members 14, 23, 43, 44, etc. were constructed of two inch diameter, schedule 40, number 1 steel tubing. The metal plates such as the plates 41, 81, 111 and 112, were constructed of 12 gauge steel sheeting, and the skids 121 and 122 were 4"×6" treated lumber. The diameter of the cradle 2 was six and one-half feet. While a single bale embodiment has been illustrated, the side frames 3 and 4 can be made any desired length to accommodate one, two, or three round bales 94, loaded end-to-end. Furthermore, while the illustrated embodiment has been shown with a gate 6, the gate 6 can be replaced with a mirror image of the end frame 5.

It is to be understood that while certain forms of the present invention have been illustrated and described herein, it is not to be limited to the specific forms or arrangement of parts described and shown.

What is claimed and desired to be secured by Letters Patent is as follows:

1. A livestock feeding apparatus, comprising:
   (a) a framework including a plurality of livestock feeding stations in at least one side frame, each said at least one side frame comprising a pair of vertical frame members at respective ends thereof, a horizontal non-pivoting top frame member fixedly connected between said vertical frame members, a horizontal station support member parallel with but spaced vertically and horizontally from said top frame member, and a plurality of side bars connected between said top frame member and said station support member, said side bars each extending downward and outward at an angle from said top frame member to said horizontal station support, each adjacent pair of said side bars forming one of said feeding stations;
   (b) a bale cradle within said framework, said cradle being adapted to support a round hay bale;
   (c) a hay saving space being formed between said horizontal station support member and said bale cradle; and
   (d) means for directing hay dropped from said round hay bale into said hay saving space.

2. A livestock feeding apparatus as in claim 1, wherein:
   (a) said cradle supports said round hay bale in a position with its longitudinal axis oriented horizontally to the ground.

3. A livestock feeding apparatus as in claim 2, wherein:
   (a) said side bars are spaced apart sufficiently to permit a feeding animal to insert only its head and neck.

4. A livestock feeding apparatus as in claim 3, wherein:
   (a) said hay saving space is sized to permit said feeding animal to just reach the round hay bale for feeding.

5. A livestock feeding apparatus as in claim 2, wherein:
   (a) said means for directing comprises a deflector extending the length of said cradle and centered beneath the longitudinal axis of said hay bale and said cradle.

6. A livestock feeding apparatus as in claim 5, wherein:
   (a) a cross-section of said deflector is shaped as an inverted V.

7. A livestock feeding apparatus as in claim 1, and further comprising:
   (a) a plurality of guards positioned in openings other than said feeding stations to prevent a feeding animal from getting stuck therein.

8. A livestock feeding apparatus as in claim 1, and further comprising:
   (a) at least one set of wheels on an axle positioned beneath said framework.

9. A livestock feeding apparatus as in claim 1, and wherein:
   (a) each said side bar includes a top portion extending outward and downward at a relatively shallow angle from said top frame member and a bottom portion extending outward and downward at a relatively steep angle from said top portion to said horizontal station support.

10. A livestock feeding apparatus as in claim 1, and further comprising:
   (a) at least one end frame, each said at least one end frame also including a plurality of feeding stations, a pair of vertical frame members, a horizontal top frame member connected therebetween, a horizontal station support member parallel with but spaced vertically and horizontally from said top frame member, and a plurality of side bars extending downward and outward at an angle from said top frame member to said station support member, each adjacent pair of said side bars forming one of said feeding stations.

11. A livestock feeding apparatus as in claim 10, wherein said framework is rectangularly shaped and includes a pair of said side frames and a pair of said end frames, and wherein:
   (a) one of said end frames comprises a gate pivotally hinged to one of said side frames to allow access to said cradle.

12. A livestock feeding apparatus, comprising:
   (a) a rectangular framework including two side frames and two end frames, each of which includes a plurality of livestock feeding stations, with each feeding station being defined by a pair of side bars spaced apart sufficiently to permit a feeding animal to insert only its head and neck, each side bar being connected between a horizontal top frame member and a station support member, said side bars each including a top portion extending outward and downward at a relatively shallow angle from said top frame member and a bottom portion extending outward and downward at a relatively steep angle from said top portion to said horizontal station support;
   (b) a bale cradle within said framework, said cradle being adapted to support a round hay bale in a position with its longitudinal axis horizontal to the ground;
   (c) a hay saving space between said horizontal station supports and said bale cradle, said hay saving space permitting said feeding animal to just reach the round hay bale for feeding;
   (d) a hay deflector means extending the length of said cradle and centered beneath the longitudinal axis of said hay bale and said cradle for directing hay dropped from said round hay bale into said hay saving space, a cross-section of said hay deflector being shaped as an inverted V; and
   (e) a plurality of guards positioned in openings within said feeder to prevent a feeding animal from getting stuck therein.

13. A livestock feeding apparatus as in claim 12, wherein:
   (a) one of said end frames comprises a gate means hinged to one of said side frames to allow access to said cradle.

14. A livestock feeding apparatus as in claim 12, and further comprising:
   (a) at least one set of wheels on an axle positioned beneath said framework.

15. A livestock feeding apparatus, comprising:
   (a) a rectangular framework including two side frames and two end frames, each of which includes a plurality of livestock feeding stations, with each feeding station being defined by a pair of side bars spaced apart sufficiently to permit a feeding animal to insert only its head and neck, each side bar being connected between a horizontal top frame member and a horizontal station support member which is parallel to, but spaced vertically and horizontally from said top frame member, said side bars each including a top portion extending outward and downward at a relatively steep angle from said top frame member and a bottom portion extending outward and downward at a relatively steep angle from said top portion to said horizontal station support;
   (b) a bale cradle within said framework, said cradle being adapted to support a round hay bale in a position with its longitudinal axis horizontal to the ground;
   (c) a hay saving space between the horizontal station supports of each said side frame and said bale cradle, each said hay saving space being formed by a hay deflector which comprises a pair of plates extending downward at opposite angles, with each plate extending along the length of said feeder, said plates being spaced apart to provide an opening in said frame which extends to ground level so that hay dropping from said bale will drop to the ground between said angled plates, said horizontal station supports being spaced from said bale cradle a distance which permits said feeding animal to just reach the round hay bale for feeding;
   (d) a plurality of guards positioned in openings within said feeder to prevent a feeding animal from getting stuck therein; and
   (e) one of said end frames comprises a gate pivotally hinged to one of said side frames to allow access to said cradle.

* * * * *